United States Patent [19]
Futakami et al.

[11] Patent Number: 5,842,761
[45] Date of Patent: Dec. 1, 1998

[54] LIQUID CRYSTAL PROJECTOR

[75] Inventors: Shigeru Futakami, Tokorozawa; Katsuo Matsuyama, Tokyo; Terutaka Okano, Tokorozawa, all of Japan

[73] Assignee: Citizen Watch Co., Ltd., Tokyo, Japan

[21] Appl. No.: 436,478
[22] PCT Filed: Sep. 14, 1994
[86] PCT No.: PCT/JP94/01523

§ 371 Date: May 23, 1995

§ 102(e) Date: May 23, 1995

[87] PCT Pub. No.: WO95/09378

PCT Pub. Date: Apr. 6, 1995

[30] Foreign Application Priority Data

| Sep. 30, 1993 | [JP] | Japan | 5-057389 |
| Sep. 30, 1993 | [JP] | Japan | 5-057390 |
| Sep. 30, 1993 | [JP] | Japan | 5-057391 |
| Sep. 30, 1993 | [JP] | Japan | 5-265551 |
| Sep. 30, 1993 | [JP] | Japan | 5-265552 |
| Sep. 30, 1993 | [JP] | Japan | 5-265553 |

[51] Int. Cl.[6] .................................................. G03B 21/14
[52] U.S. Cl. ............................ 353/119; 353/57; 353/87
[58] Field of Search ............................ 353/119, 122, 353/57, 60, 61, 87; 349/58, 60

[56] References Cited

U.S. PATENT DOCUMENTS

| 4,925,295 | 5/1990 | Ogawa et al. | 353/57 |
| 4,976,429 | 12/1990 | Nagel | 353/112 |
| 5,092,671 | 3/1992 | Van Os | 353/31 |
| 5,170,196 | 12/1992 | Itoh | 353/119 |
| 5,287,132 | 2/1994 | Suzuki et al. | 353/57 |
| 5,347,324 | 9/1994 | Sasaki et al. | 353/119 |
| 5,418,586 | 5/1995 | Fujimori et al. | 353/122 |

FOREIGN PATENT DOCUMENTS

| 49-30506 | 8/1974 | Japan . | |
| 52-130633 | 11/1977 | Japan . | |
| 54-4850 | 3/1979 | Japan . | |
| 55-32859 | 3/1980 | Japan . | |
| 60-26043 | 2/1985 | Japan . | |
| 60-158428 | 8/1985 | Japan . | |
| 63-4217 | 1/1988 | Japan . | |
| 63-174007 | 7/1988 | Japan . | |
| 64-6927 | 1/1989 | Japan . | |
| 3-280004 | 11/1991 | Japan . | |
| 4-27929 | 1/1992 | Japan . | |
| 0450937 | 2/1992 | Japan | 353/57 |
| 4-147291 | 5/1992 | Japan . | |
| 4288526 | 10/1992 | Japan . | |
| 3-51881 | 3/1993 | Japan . | |
| 5-80312 | 4/1993 | Japan . | |
| 5-950 | 12/1993 | Japan . | |

Primary Examiner—William Dowling
Attorney, Agent, or Firm—Finnegan, Henderson, Farabow, Garrett & Dunner, L.L.P.

[57] ABSTRACT

A liquid crystal projector is provided which features easy lamp replacement, accurate detection of liquid crystal cell temperature, and easy assembly and maintenance, the illumination source either being installed on a first illumination source support or installed on the second illumination source support and an illumination source support spring. A unit consisting of the illumination source installed on the first illumination source support is held between the second illumination source support and the illumination source support spring which are mounted on the main frame structure. A polarizer and a liquid crystal cell are held between a support which has a hook and a catch, a temperature detector installation part for installing a temperature detector which detects the temperature of the liquid crystal cell being provided on the support. A holder is used to cause the temperature detector to make contact with the liquid crystal cell of the liquid crystal projector. The liquid crystal projector configuration can have either a baffle provided on the heat-connection hole of the main frame structure or have the illumination source housed in a second frame structure which is smaller than the main frame structure, either depressions and protrusions being provided on the joining parts of an opening provided in the main frame structure and a cover which covers this opening, the purpose of these being to provide heat radiation and blockage of light, or the outer lens tube being divided into two parts and supported by a support.

36 Claims, 13 Drawing Sheets

LIQUID CRYSTAL PROJECTOR

BACKGROUND OF THE INVENTION

1. Field of the Invention

The present invention relates to a liquid crystal projector which uses a liquid crystal panel, and more specifically it relates to the supporting structure of a liquid crystal panel, and specifically to the supporting structure of an illumination unit or projection lens element which illuminates a liquid crystal panel, and to the protection of components inside the liquid crystal projector from heat generated within a liquid crystal projector which uses a liquid crystal panel.

2. Description of the Related Art

Liquid crystal projectors include a three-layer type which uses three liquid crystal panels, one for each of the colors red, green, and blue, and a single-layer type with just a single layer, in which are located red, green, and blue filters, and in recent years a liquid crystal projector of this single-layer type, which is compact and lightweight, making it convenient for portable use, has begun to be commercially available.

The Unexamined Patent Publication Hei 4-27929 explains, in detail, this prior art.

FIG. 7 shows an example of a prior art liquid crystal projector of the single-layer type, this prior art liquid crystal projector being described, in general, below.

An illumination unit 203 includes a light source 220 and a reflector 230, and an explosion-proof tube (not shown in the drawing) is often used to house the light source 220. The light emitted from the illumination unit 203 is collected by a condenser lens 202, enters an entrance-side polarizer 101, passes through a liquid crystal cell 111, passes through an exit-side polarizer 112, passes through a projection lens 300, and is then output from the liquid crystal projector 200. The original image which is projected is formed by the entrance-side polarizer 101, the liquid cell 111, and the exit-side polarizer 112.

The circuit 600 which performs drive control, the condenser lens 202, the projection lens 300, the liquid crystal cell 111, the above-noted illumination unit 203 and the fan 400 which air cools the inside of the liquid crystal projector 200 are covered by the frame structure 500.

In a liquid crystal projector such as described above, the structure includes a large number of elements, and in addition to housing these elements in a small space, it is necessary to ensure that the installation of such elements is such that it facilitates the maintenance of such elements. As shown in FIG. 7, in the prior art, a supporting structure 204 was provided at the condenser lens 202, a supporting structure 104 was provided at the entrance-side polarizer 101, and the liquid crystal cell 111 and exit-side polarizer 115 were held between a supporting frame structure 116.

Because assembly was done by mounting the condenser lens 202, the entrance-side polarizer 101, and such components into the supporting structure such as the supporting structure 204, it was necessary to have a supporting structure for each mounted component, making necessary a large space inside the liquid crystal projector. In order to support the entrance-side polarizer 101 and condenser lens 202 in the lateral direction (in the direction of the observer with respect to the drawing) in the prior art, depressions and protrusions were provided in the mounting frame structure mounted in the lateral direction to provide a structure to support these components, and this involved the problem of the labor required to fit the edges of these components between the depressions and protrusions in the frame structure. In addition, the liquid crystal panel unit 110 shown in FIG. 7 uses screws to implement it as a unit, the tightening of these screws presenting the problems of added labor steps in both assembly and maintenance.

In addition, in the prior art liquid crystal projector as described above, a high-intensity xenon lamp, halogen lamp, metal halide lamp, or the like is used as the light source 220, this type of lamp generating a considerable amount of heat. In the prior art liquid crystal projector as shown in FIG. 7, because the transmissivity of the polarizers is low, approximately 60% of the light emitted from the illumination unit 203 is converted to heat at the entrance-side polarizer 101. In a liquid crystal projector in particular, because of the high lamp intensity, there is a particularly large amount of heat generated at the entrance-side polarizer 101. For this reason, in addition to a large change occurring in the characteristics of the liquid crystal due to the high temperatures involved, there was the problem of excessive temperature rise causing a loss of the characteristics of the liquid crystal. In addition, this could cause deterioration of the polarizer, thereby worsening the appearance of the projected image, and also causing a shortening of the life of the liquid crystal cell 111 and a deterioration of the frame structure, which is made of resin.

Methods such as monitoring the temperature rise and cutting off the illumination when the temperature rises to a given value are used, and a temperature sensing element such a thermistor 185 was provided, as shown in FIG. 7, in the vicinity of the panel. However, because the temperature sensing element was located between the entrance-side polarizer 101 and the liquid crystal cell 111, it was easily affected by the fan, presenting the problem of not being able to accurately measure the temperature of the liquid crystal cell 111.

A liquid crystal projector of the above-described type is also described in detail in the Unexamined Utility Model Publication Hei 1-10783 and the Unexamined Utility Model Publication Sho 63-54126, these being single-layer type liquid crystal projectors shown in FIG. 8 and FIG. 9.

In FIG. 8 and FIG. 9, a high-intensity lamp such as a xenon lamp, a halogen lamp, or a metal halide lamp is used as the light source in the illumination unit 280, a reflector 230 being provided at the side and rear of the light source.

The illumination unit 280, as shown in FIG. 9, is configured with lamp 220, which has a connecting terminal 221 for the purpose of supplying electricity to the lamp 220, and a reflector 230, these being housed inside an explosion-proof tube 282, which is housed in an illumination box 281. Because a high-intensity lamp is used, since the lamp 220 generates much heat, the explosion-proof tube 282 is provided with heat convection holes 205. In addition, the end of explosion-proof tube 282 is provided with a glass cover 206.

Light emitted from the illumination unit 280, after either being collected by a condenser lens (not shown in the drawing) or not enters the liquid crystal panel unit 110. The liquid crystal panel unit 110 is formed of a liquid crystal cell which is a liquid crystal material sandwiched between two glass elements, which are the entrance-side polarizer plate and exit-side polarizer plate, with a voltage applied to electrodes provided on the opposing surfaces of these two glass plates to operate the liquid crystal material so as to form the original image to be projected.

In addition, the light of the image formed by means of the illumination panel unit passes through the projection lens unit 300, exits the liquid crystal projector, and is projected in magnified form on a screen.

The above-noted illumination unit 280, liquid crystal panel unit 110, and projection lens 300, as shown in FIG. 8, are covered by the frame structure 500 and 500', which can be divided into a top and bottom part. At least one part of frame structure 500 and 500', has provided in it holes 505 and holes 506 for the purpose of convection heat from inside the liquid crystal projector to the outside.

In a prior art liquid crystal projector as described above, a high-intensity lamp such as a xenon lamp, a halogen lamp, or a metal halide lamp is used as the lamp 220 of the illumination unit 280, and this type of lamp generates considerable heat. Also, because the transmissivity of the polarizer plates is low in this liquid crystal project, approximately 60% of the light emitted from the illumination unit 280 is converted to heat at the entrance-side polarizer plate, this causing a further rise in temperature within the liquid crystal projector. There are also cases in which a heat-absorbing filter or infrared-cutting filter or an infrared-reflection filter or the like is provided between the illumination unit 280 and the liquid crystal panel unit 110, and in this case the amount of heat generated by the heat-absorbing filter is large in comparison to the heat generated by the above-noted entrance-side polarizer plate. In either case, the heat generated at the illumination unit 280, the entrance-side polarizer plate, and the heat-absorbing filter is large, and because of the resulting rise in temperature occurring within the liquid crystal projector, which is surrounded by the frame structure 500 and 500', even when the holes 205 are provided, as shown in FIG. 9, the use of a sealed construction by means of the illumination box 281 and the explosion-proof tube 282, cause a drastic drop in the ventilation effectiveness, this leading to a cause of the further shortening of the life of the lamp 220.

In the liquid crystal projector as described above, the projector is constructed of a large number of components, and in addition to housing these components in a small space, it is necessary to see to it that installation of such components is such that it facilitates maintenance of such elements. As shown in FIG. 9, with a lamp 220 of sealed construction and the front edge of the lamp 220 held in place in the illumination box 281 or explosion-proof tube 282 using adhesive or the like, not only does the replacement of lamp 220 require time, but also removing the lamp 220 in FIG. 8 requires that the frame structure be divided into top and bottom parts 500 and 500', thereby requiring even more time for lamp replacement.

SUMMARY OF THE INVENTION

An object of the present invention is an improvement of the defects in the prior art by providing a liquid crystal projector which not only introduces sufficient thermal compensation while being compact, but which also provides simplified construction and easy disassembly and removal, thereby facilitating parts replacement for maintenance in the case of failure.

A projector according to the present invention adopts the following basic constitution.

To achieve the objects and in accordance with the purpose of the invention, as embodied and broadly described herein, the liquid crystal projector of this invention comprises at least an illumination unit, a liquid crystal panel unit, a projection lens unit, and a frame structure in which the units are contained in a manner allowing free removal of each unit, the liquid crystal panel unit including a liquid crystal cell and a polarizer being supported integratedly but separately by a liquid crystal panel unit support member in such a manner to enable their removal from said frame structure, the liquid crystal panel unit support member having a first support member and a second support member disposed oppositely to the first support member, and a plurality of hooks and catches being provided respectively on the first and second support members in an opposing relationship, the first and second support members being removably joined together by the hooks and catches to hold the liquid crystal cell securely.

In an implementation of the liquid crystal projector having a configuration as described above, and more specifically an implementation of the first aspect of construction, in which the liquid crystal projector is formed, for example, from a liquid crystal panel unit, an illumination unit, and a projection lens unit, the liquid crystal panel unit has at least an entrance-side polarizer, a liquid crystal cell, an exit-side polarizer, a first support, and a second support. Hooks and catch are provided on the first support and the second support, respectively, for the purpose of joining the first support and the second support, and a first hook and second hook are provided on the first support.

In a second aspect of a liquid crystal projector according to the present invention, the configuration is one which has at least a liquid crystal panel unit, a first illumination unit, and a projection lens unit, the illumination source having at least a lamp and a reflector, and above-noted first illumination unit having the above-noted illumination source, a socket, and a first illumination source support, the above-noted illumination source being linked to the socket, the above-noted first illumination source support supporting the illumination source base in one direction, and the above-noted first illumination source support supporting the reflector of the illumination source from a direction that is opposite from the direction of support of the lamp base by the first illumination source support.

In the present invention, by adopting the above-described configuration, because the liquid crystal projector has an entrance-side polarizer, a liquid crystal cell, and an exit-side polarizer which are unitized by means of a support having a hook and a catch, the liquid crystal projector is easy to assemble, easy to maintain, and compact.

In addition, by providing a temperature-detection element within this unit, with the temperature-detection element in contact with the liquid crystal cell, the effect is to improve the image quality, improve the ease of assembly, improve the ease of maintenance, and improve compactness.

According to the configuration of the illumination unit of a liquid crystal projector of the present invention, by means of a support provided on the second illumination source support and an illumination source support spring part, because forces in at least two directions which support a reflector which is approximately conical in shape are applied along the approximate central axis of the lamp which is disposed approximately on the axis of the approximately conical shape, it is possible to achieve stable support of the illumination source, which is formed of the reflector and the lamp. Also, because the illumination source is supported by a spring part that holds it between at least two locations along its outer circumference, it is easy to release the spring in the up/down direction, and it is easy to remove and install the lamp.

In accordance with the configuration of the illumination unit of a liquid crystal projector according of the present invention, the up/down movement of the illumination source, which is formed by the reflector and the lamp, is limited by the receiving parts at two locations, and because the illumination source is supported by the socket located on the first illumination source support 211, the only limit on the illumination source in the front-to-back direction is provided by the socket, thereby enabling the easy removal and installation of the illumination source.

In accordance with the configuration of the illumination unit of a liquid crystal projector according to the present invention, because the first illumination unit is supported by both the illumination source support spring part and the support that supports the reflector open end which is provided on the frame structure, it is easy to hold the first illumination support and remove it from the liquid crystal projector when replacing the illumination source, which is chiefly formed by the lamp and the reflector. In addition, it is possible to pull the first illumination unit from the liquid crystal projector without touching the reflector.

In addition, by virtue of the configuration of the illumination unit of a liquid crystal projector according to the present invention, because both sides of the illumination source are open, there is an improvement in the air cooling of the illumination source.

DESCRIPTION OF THE PREFERRED EMBODIMENT

The preferred embodiment of the present invention will be described below, with reference made to the accompanying drawings.

First, the first aspect of a liquid crystal projector according to the above-noted present invention will be described.

Figure 1:
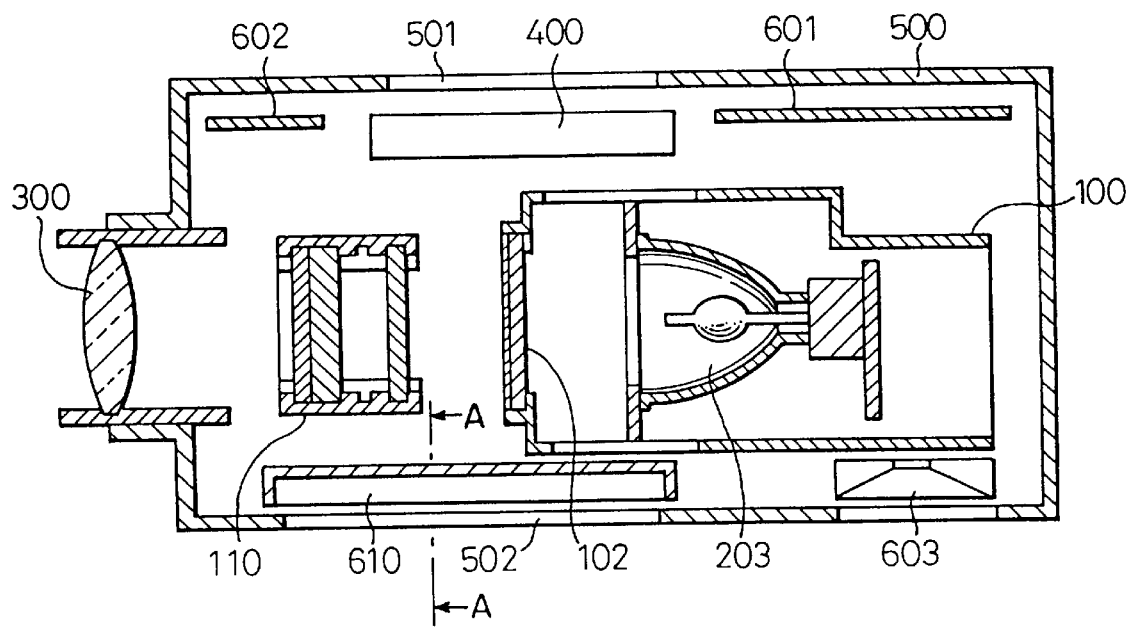
FIG. 1 is a cross-sectional view of a liquid crystal projector which shows an embodiment of the present invention.

FIG. 1 is an overall cross-sectional view which shows the configuration of an example of a liquid crystal projector which is an embodiment of the first aspect of the present invention. Specifically, in FIG. 1, the illumination unit 203, which is formed by reflector and a lamp, is provided within a frame structure (a first frame structure) 500, a heat absorbing filter 102 being provided at the light output side of the illumination unit 203, this heat absorbing filter 102 being supported by a support made of a transparent material, although this support can be eliminated. The heat absorbing filter can be either an infrared cutting filter or an infrared reflecting filter. The illumination unit 203 and heat absorbing filter 102 are covered by a second frame structure 100, which has ventilation holes. A liquid crystal panel unit 110 is positioned near the illumination unit 203 opposite to the heat absorbing filter 102, this liquid crystal panel unit being formed from an entrance-side polarizer, a liquid crystal cell, an exit-side polarizer, and a support which supports these elements. As the liquid crystal cell, it is possible to use, in place of a TN cell, an STN (super twist nematic) cell, and when an STN cell is used, it is possible to position the STN liquid crystal cell phase compensation section on the liquid crystal panel unit 110.

Figure 2:
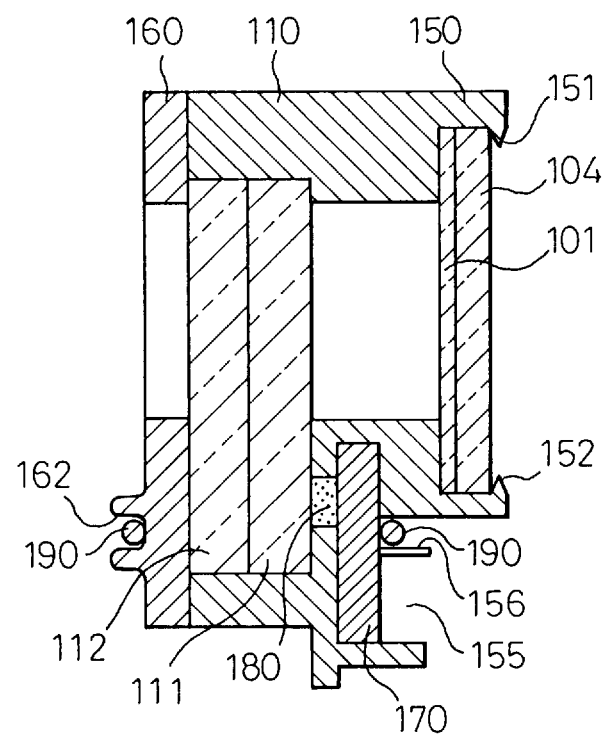
FIG. 2 is a cross-sectional view of liquid crystal panel unit 110 of an embodiment of the present invention.
Figure 3:
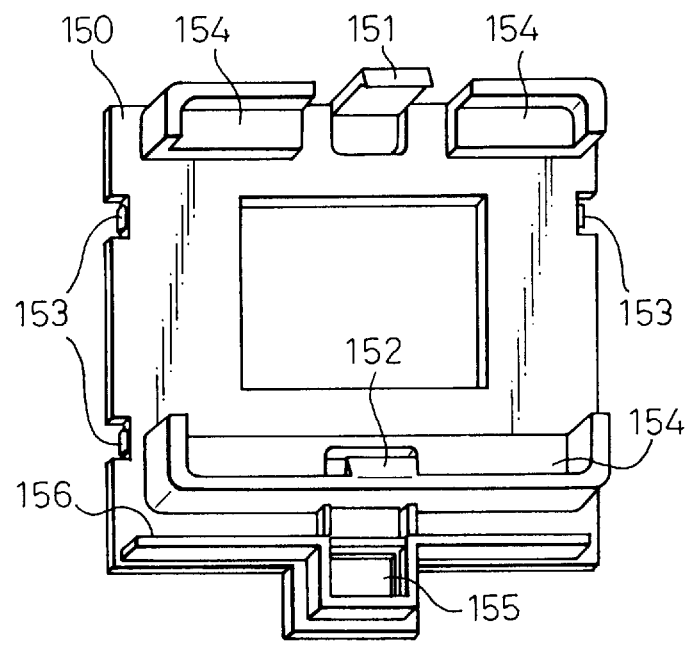
FIG. 3 is a perspective view of a support 150 which is part of the liquid crystal panel unit 110 of an embodiment of the present invention.
Figure 4:
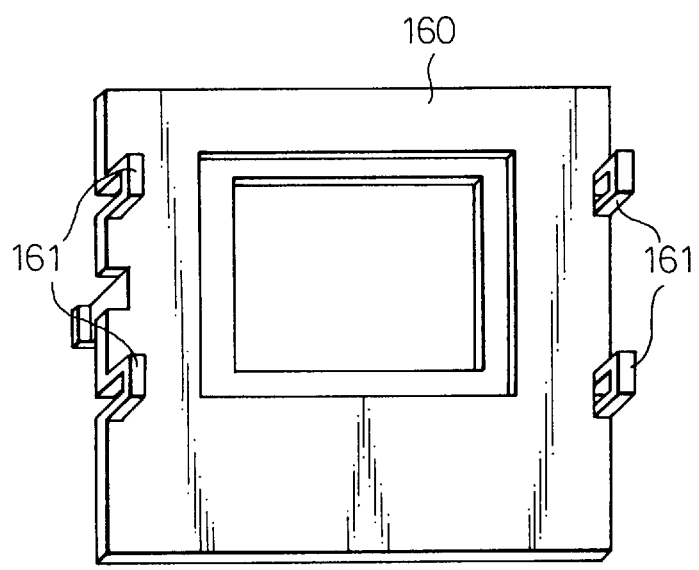
FIG. 4 is a perspective view of a support 160 which is part of the liquid crystal panel unit 110 of an embodiment of the present invention.

FIG. 2 shows a detailed cross-sectional view of an embodiment of the liquid crystal panel unit 110. FIG. 3 shows a perspective view of the first support 150 which is part of the liquid crystal panel unit 110 shown in FIG. 2, and FIG. 4 is a perspective view of the second support 160.

In FIG. 2, an entrance-side polarizer 101 which is adhered to the support 104 is received by the receivers 154 located on the ends of the first support 150 shown in FIG. 3, and is also supported by the first hook 151 and second hook 152, which are provided on the ends of the first support 150. At the edge of the first support 150 which supports the entrance-side polarizer and the edge of the first support 150 on the opposite side, a depression is provided as show in FIG. 2, the liquid crystal cell 111 onto which is adhered the exit-side polarizer 112 being provided in this depression, this being held between the first support 150 and the second support 160. In doing this, the first support 150 and the second support 160 are linked by means of the hook 153 and the catch 161, which are shown in FIG. 3 and FIG. 4, so as to hold the liquid crystal cell securely.

In another example of the first aspect of the present invention, it is desirable to detect the temperature of the liquid crystal cell which is used, and for that reason it is desirable to provide a temperature detector 180 at the liquid crystal cell. It is desirable that the temperature detector mounting section 155 for providing this temperature detector 180 be provided at the above-noted first support 150. It is also desirable that the temperature detector 180 make physical contact with the liquid crystal cell.

Figure 5:
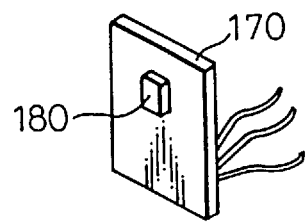
FIG. 5 is a perspective view of a temperature detector 180 of an embodiment of the present invention.

Specifically, as shown in FIG. 3, temperature detector 180 is provided at the liquid crystal panel unit 110, and for this reason, as shown in FIG. 3, a temperature detector mounting section 155 is provided on the first support 150. The temperature detector 180, which is shown in FIG. 5, is provided at this temperature detector mounting section. In the embodiment of the present invention, a type S8100BFSA CMOS temperature sensor, manufactured by Seiko Denshi, is used, the board 170 being used to mount this CMOS temperature sensor.

It is also possible to use a thermistor or a thermocouple instead of a CMOS temperature sensor as the temperature sensor. By appropriately forming the shape of the temperature detector 180 and the temperature detector mounting section 155, it is possible to eliminate the board 170. Furthermore, in the present invention, it is also possible to mount the temperature sensor directly onto the glass substrate.

Figure 6:
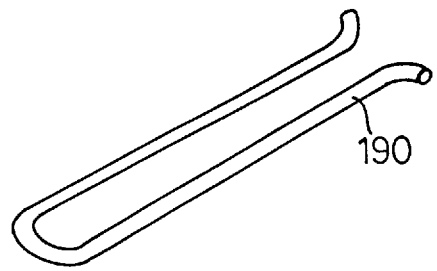
FIG. 6 is a perspective view of a holder 190 of an embodiment of the present invention.

A holder 190 is provided on the liquid crystal panel unit 110 for the purpose of holding the temperature detector 180 in contact with the liquid crystal cell 111 and, as shown in FIG. 2 and FIG. 3, holder 190, which is shown in FIG. 6, is provided at the guide 162 of second support 160 and the guide 156 of first support 150, this holder 190 providing a spring force which holds the temperature detector 180 in physical contact with the liquid crystal cell 111.

In this embodiment of the present invention, a metal pin is used as the holder 190, but it is also possible to form holder 190 from resin, and also possible to form a bendable tongue as one with the first support 150 at the temperature detector mounting section 155.

A projection lens unit 300 is provided at the light-exit side of the liquid crystal panel unit 110.

These components, including the illumination unit 203, the liquid crystal panel unit 110, and the projection lens unit 300, are covered by the first frame structure 500 which has the ventilation holes 501 and 502. The ventilation holes 501 and 502 also serve as heat-radiating holes. In addition, inside the first frame structure 500 there are such elements as a fan 400 which forcibly creates an air flow within the frame structure, circuit 601 and circuit 602 which include circuits that control and drive the liquid crystal projector, and a speaker 603 which outputs sound.

The light from illumination unit 203, after having infrared energy, the main cause of heat generation, removed from it by the heat absorbing filter 102, enters the entrance-side polarizer 101 of the liquid crystal panel unit 110. Light which exits from the entrance-side polarizer enters the liquid crystal cell 111, this light becoming an image which is formed by the exit-side polarizer 112, this then entering the projection lens unit 300, after which it exits the projection lens unit 300 and is displayed in magnified form on a screen.

In addition to generating light, illumination unit 203 generates heat and reaches a high temperature, and the heat absorbing filter 102 also generates heat and reaches a high temperature. However, air is forced in from ventilation hole 501 provided in the first frame structure 500 by means of the fan, thus providing air cooling of the second frame structure 100, and also providing direct air cooling of the heat absorbing filter 102, illumination lamp, and reflector from the ventilation hole in the second frame 100. The air which has picked up the heat from the second frame structure 100, the illumination unit 203, and the heat absorbing filter 102 passes through the ventilation hole of the baffle 610, and air escapes to the outside of the first frame structure 500 via ventilation hole 502 which is provided in the first frame structure 500.

The above-noted air flow is created by the fan 400, which draws air into the liquid crystal projector from the ventilation hole 501. It is also possible, however, to exhaust air from the liquid crystal projector through ventilation hole 501, using the fan 400.

As described above, according the present invention, because the entrance-side polarizer, the liquid crystal cell, and the exit-side polarizer are unitized as one by means of a hook and catch, there is an improvement in ease of assembly, ease of maintenance, and compactness.

Also, in addition to providing a temperature detection element inside the above-noted unit, because the temperature detection element is in physical contact with the liquid crystal cell, it is possible to detect the temperature of the liquid crystal cell, thereby enabling accurate temperature detection, making possible precise temperature compensation, this having the effect of improving image quality, ease of assembly, ease of maintenance, and compactness.

Figure 10:
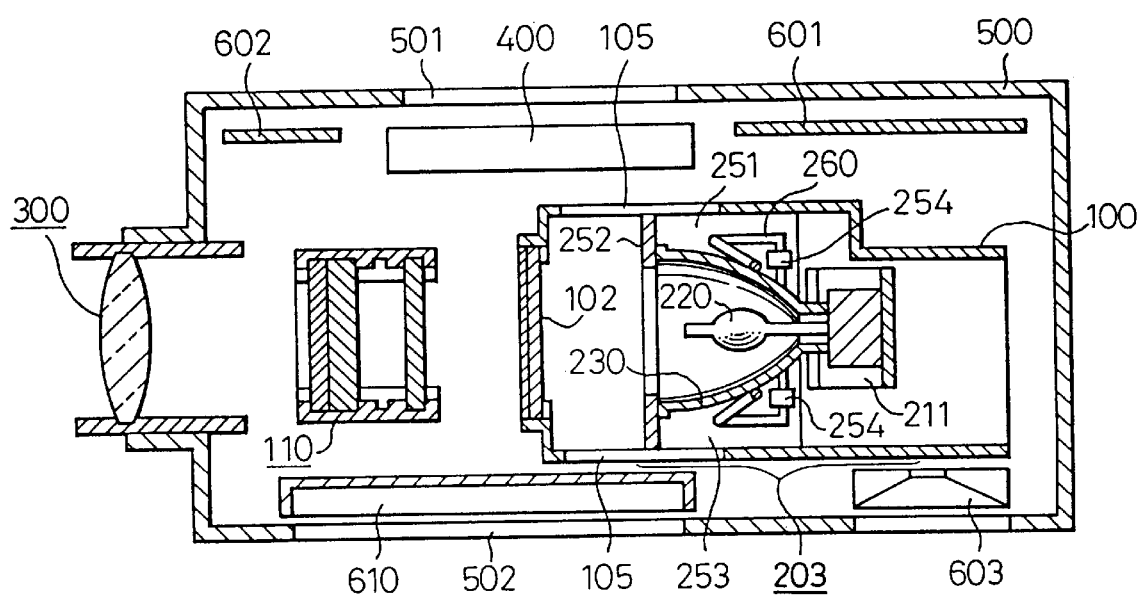
FIG. 10 is a cross-sectional view of a liquid crystal projector which shows an embodiment of the present invention.

Next, the example of the configuration of a second aspect of a liquid crystal projector according to the present invention will be described, with reference being made to FIGS. 10 to 13. Specifically, FIG. 10 shows an overall cross-sectional view of the second aspect of a liquid crystal projector, according to the present invention, in which an illumination unit 200, formed from elements which include a reflector and a lamp, is provided inside a frame structure 500, a heat absorbing filter 102 being provided at the exit side of this illumination unit 200, this heat absorbing filter 102 being supported by a support made of transparent material. Note, however, that it is possible to eliminate this support. The heat absorbing filter 102 can be either an infrared cutting filter or an infrared reflecting filter. The illumination unit 200 and heat absorbing filter 102 are covered by second frame structure 100, which has ventilation hole 105, this second frame structure 100 being is separately provided inside the above-noted the first frame structure 500. In this sense the first frame structure 500 will be referred to as the first frame structure.

Figure 11:
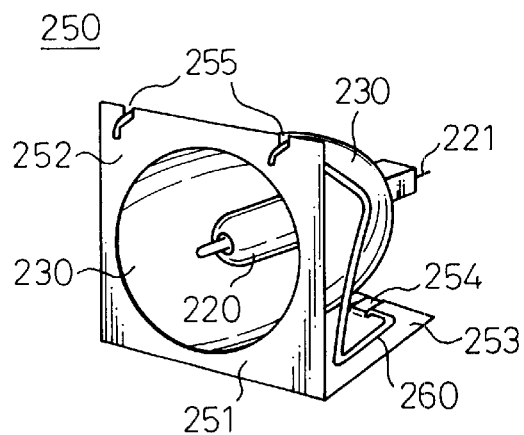
FIG. 11 is a perspective view of a second illumination unit of an embodiment of the present invention.
Figure 12:
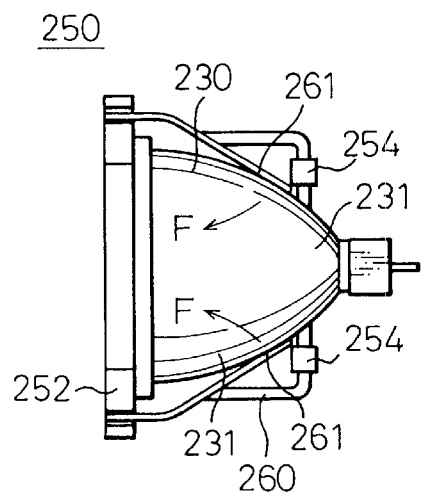
FIG. 12 is a top view of a the second illumination unit of an embodiment of the present invention.
Figure 13:
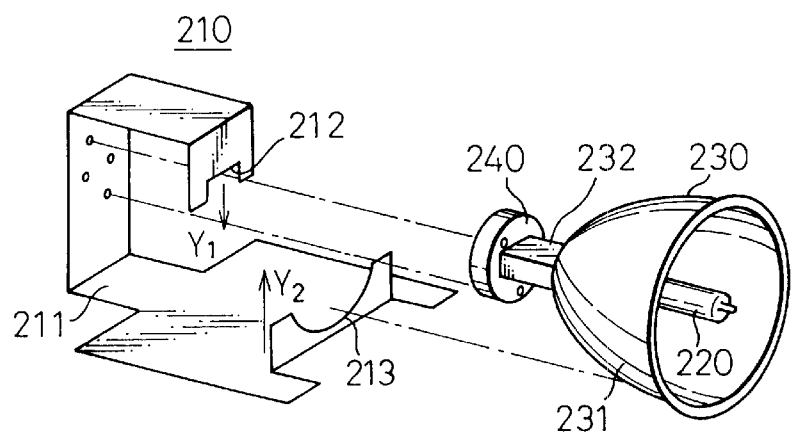
FIG. 13 is a perspective view of a first illumination unit of an embodiment of the present invention.

FIGS. 11 through 13, which show details of the illumination unit 200 of this embodiment of the present invention will now be used to provided a detailed description of illumination unit 200.

In FIG. 13, the first illumination unit 210 is chiefly formed by the first illumination source support 211, a socket 240, a reflector 230, and a lamp 220, with the receiver 212 of the first illumination source support 211 provided so as to support the illumination source neck 232, which is formed by the lamp 220 and the reflector 230, and with receiver 213 provided on the first illumination source support 211 so as to support reflector outside 231 of the reflector 230.

With regard to the method of assembling the first illumination unit 210, the socket 240 is held by screws onto the first illumination source support 211, the lamp connection terminals being then inserted into this screw-held socket 240, the illumination source neck 232 being positioned into the receiver 212 of the first illumination source support 211, and the outside 231 of the reflector being positioned into the receiver 213 of the first illumination source support 211.

By providing the first illumination unit 210 with a configuration as described above, the illumination source is supported receiver 212 by support force Y1 from the top in a downward direction, and by receiver 213 by support force Y2 from the bottom in an upward direction, thereby providing stable support.

That is, because the illumination source is supported from top and bottom by means of the support force Y1 from receiver 212 and the support force Y2 from receiver 213 and supported with respect to front/back movement by the socket 240, it is possible to insert and remove the illumination source from the first illumination source support by merely applying front/back force to the illumination source.

The first illumination source support 211 as shown in FIG. 13 of the first illumination unit 210 is positioned at the illumination unit 200 position as shown in FIG. 10, and is provided in the first frame structure 500 or second frame structure 100.

In yet another possible configuration of the second of aspect the liquid crystal projector according to the present invention, which has at least a liquid crystal panel unit, a second illumination unit, and a projection lens unit, the second illumination unit has at least an illumination unit, a second illumination source support, and a illumination source support spring which is provided on the above-noted second illumination source support, the illumination source comprising at least a lamp and a reflector, and the support force of the above-noted illumination source support spring is positioned at the approximate center axis of the above-noted lamp.

FIG. 11 and FIG. 12 will be used to provided a description of another illumination unit 250 of this example of the present invention.

FIG. 11 is a perspective view of the second illumination unit 250, while FIG. 12 is a top view of this second illumination unit 250.

In FIG. 11, the second illumination unit 250 is chiefly formed by the second illumination source support structure 251, the illumination source support spring 260, the reflector 230, and the lamp 220, with a support 252 provided on support structure 251 so as to support the aperture of the reflector 230, and with a spring support 254 provided at the support base 253 of the second illumination source support structure 251 for the purpose of supporting the illumination source support spring 260.

Leads (not shown in the drawing) are soldered to the connection terminals of the lamp 220 for the purpose of supplying electric power so that the lamp generates light.

With regard to the method of assembling the second illumination unit 250, the spring support 254 of the second illumination source support structure 251 is in the form of a hook, this hook being hooked onto the illumination source support spring 260, the end of the illumination source support spring 260 being hooked into the cutout in the second illumination source support structure 251. Next, the open part of the reflector, which is part of the illumination source, is held in physical contact with the support 252 as the outside 231 of the reflector 230 is used to open up the illumination source support spring 260, thereby completing the second illumination unit as shown in FIG. 11.

The thus-completed second illumination unit 250 is held securely to the open part of the reflector 230 by support 252, with the illumination source support spring 260 applying force F as shown in FIG. 12 so as to position it at the center of the opening of the reflector 230.

In addition, the second illumination source support structure 251 of the second illumination unit 250 is positioned, as shown in FIG. 10, at the position of the illumination unit 200, and is provided in either the first frame structure 500 or the second frame structure 100.

Another possible configuration of the above second aspect of the present invention is one in which the liquid crystal projector has at least a liquid crystal panel unit, a first illumination unit, and a projection lens unit, the illumination source having at least a lamp and a reflector, and the above-noted first illumination unit having the illumination source, a socket, and a first illumination source support, the illumination source being linked to the noted socket, the first illumination source support supporting the reflector of the above-noted illumination source from a direction opposite that of the support from the base of the lamp, the illumination source support spring provided at a second illumination source support pushing the reflector in a forward direction of the illumination source, along a center axis of the reflector and a support provided at the second illumination source support, which is provided in front of the illumination source, supporting the illumination source.

Another configuration of the above aspect of the present invention will be described below, with reference made to FIG. 10, FIG. 11, and FIG. 13.

In FIG. 10, the support base of the second illumination source support structure 251 is mounted to the second frame structure 100 in place of the illumination source support spring 260 which is shown in FIG. 11. It is also possible to mount the support base 253 of the second illumination source support structure 251 to the first frame structure 500, and further possible to form the support 252, the cutout 255, and the spring support 254 as one with the first frame structure 500, and it is possible to form the support 252, the cutout 255, and the spring support 254 directly as one onto the second frame structure 100.

As shown in FIG. 13, the first illumination unit 210 is assembled, this being chiefly formed by the first illumination source support 211, which has receiver 213 for the purpose of holding the outer surface 231 of the reflector 230, the receiver 212 for the purpose of holding the neck 232 of the illumination source, and the part for holding the socket, the socket 240, the reflector 230, and the lamp 220, the first illumination unit 210 being assembled into the second illumination source support structure 251, which is provided in the above-noted second frame structure 100.

In this situation the receiver 212 is made to align with the support base 253 of the second illumination source support structure 251, the outer surface 231 of the reflector 230 provided in the first illumination unit 210 being held by the illumination source support spring 260.

The projection lens unit 300 is provided on the light-exiting side of the liquid crystal panel unit 110.

The illumination unit 200, the liquid crystal panel unit 110, and the projection lens unit 300, are covered by the first frame structure 500 which has the ventilation holes 501 and 502 and which also serve as heat-radiating holes. Inside the first frame structure 500 there are such elements as a fan 400 which forcibly creates air flow within the frame structure, circuit 601 and circuit 602 which include circuits that control and drive the liquid crystal projector, and a speaker 603 which outputs sound. The fan 400 can also provided outside the first frame structure 500.

The light from illumination unit 200, after having infrared energy, the main cause of heat generation, removed from it by the heat absorbing filter 102, enters the entrance-side polarizer of the panel. Light which exits from the entrance-side polarizer enters the liquid crystal cell, this light becoming an image which is formed by the exit-side polarizer, and then enters the projection lens unit 300, after which it exits the projection lens unit 300 and is displayed in magnified form on a screen.

By virtue of the above-described configuration of the present invention, because the lamp is supported by means of a support provided at the second illumination source support stand and an illumination source support spring, it is easy to mount and remove the illumination source, and the time required for assembly and maintenance is reduced.

According to the configuration of the illumination unit of a liquid crystal projector according to the present invention, because the lamp is supported by two receivers provided in the first illumination source support stand and by the first illumination source support 211, it is easy to mount and remove the lamp, and the time required for assembly and maintenance is reduced.

According to the configuration of the illumination unit of a liquid crystal projector according to the present invention, because the first illumination unit is supported by a support and a illumination source support spring that supports the reflector open part provide on the frame structure, when replacing the illumination source, which is chiefly formed by the lamp and the reflector, it is easy to hold the first illumination source support and remove it from the liquid crystal projector, and it is also possible to replace the illumination source without having to touch the reflector, thereby improving the quality of the illumination source.

In addition, because both sides of the illumination source are open, there is an improvement in the air cooling of the illumination source.

Even in the above-noted example of a liquid crystal projector according to the present invention, there are problems that remain to be solved. Specifically, the leakage of light which is radiated from the light source and which escapes through the openings formed by the ventilation holes in the liquid crystal projector to the outside of the first frame structure 500, and particularly in the case of a liquid crystal projector for portable use, which has limits imposed on it in terms of power supply size, if there is much light leakage, it can be difficult to view the image on the screen, and there is a growing need to solve this problem.

A third aspect of a liquid crystal projector according to the present invention is for the purpose of solving the above-noted problem, and the configuration of that aspect will be described by example below.

Figure 8:
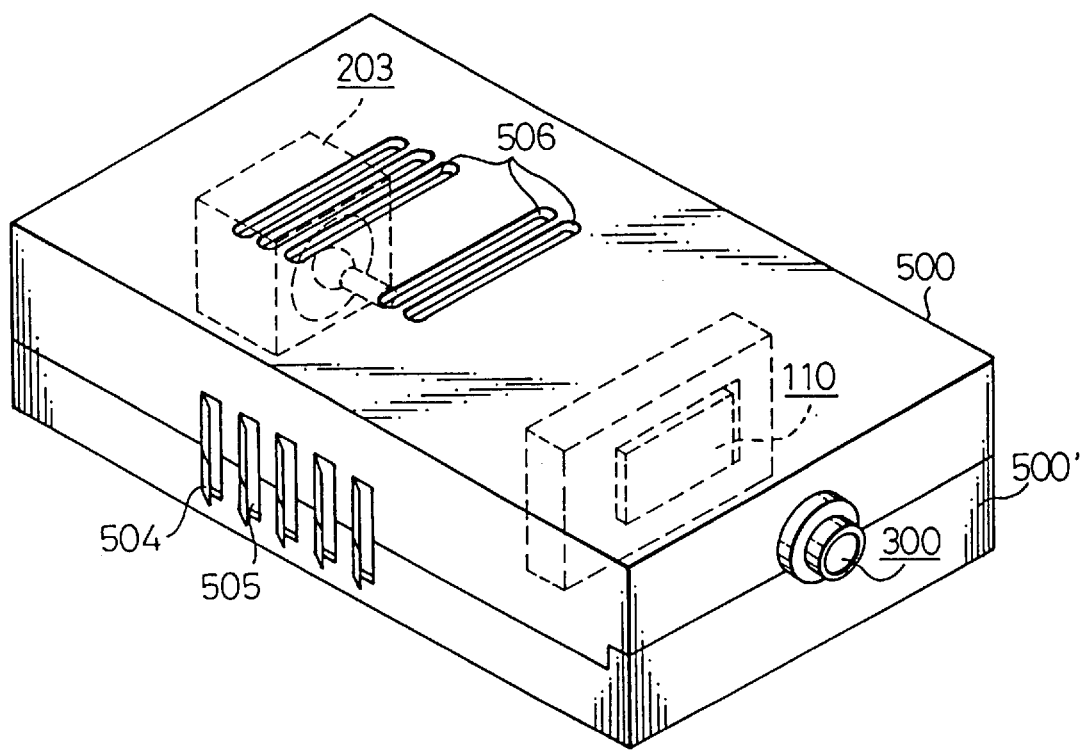
FIG. 8 is a perspective view of a liquid crystal projector which shows the prior art.
Figure 9:
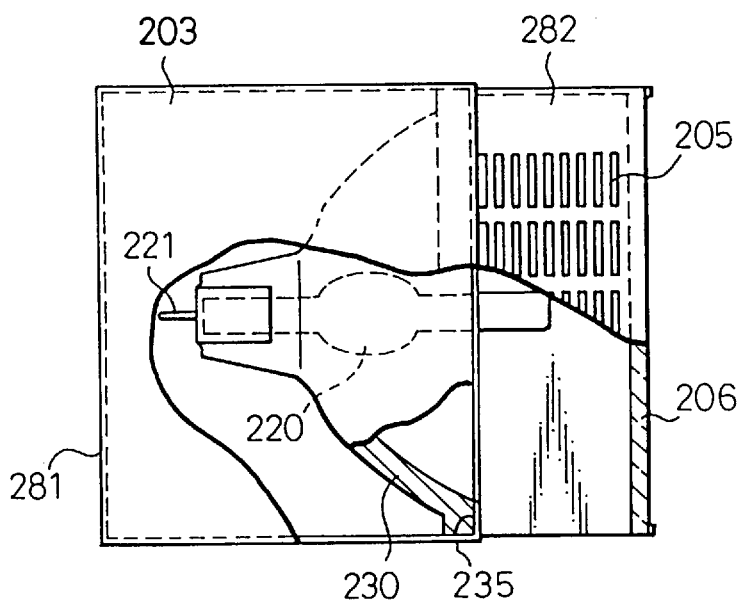
FIG. 9 is a perspective view of an illumination unit of a liquid crystal projector which shows the prior art.
Figure 14:
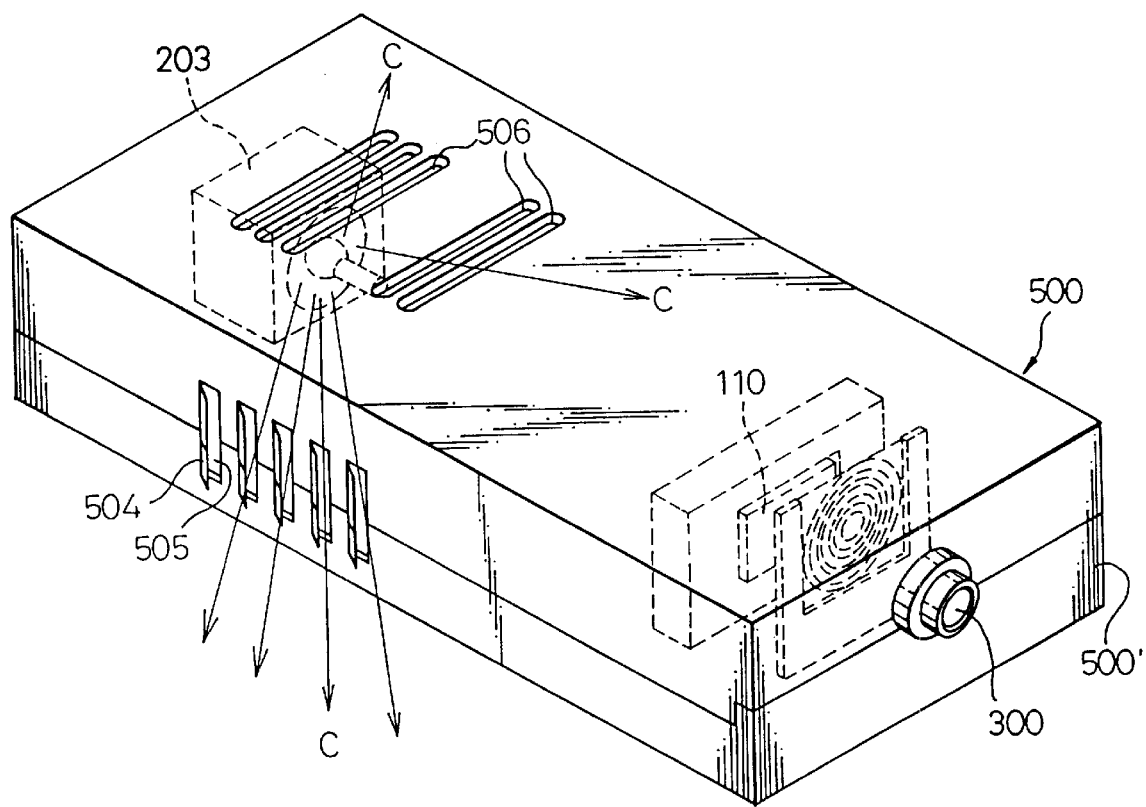
FIG. 14 is a simplified drawing of a single-layer liquid crystal projector which shows the prior art.

Because the basic construction of the liquid crystal projector shown in FIG. 14 is substantially the same as that shown in FIG. 1 and FIG. 8, the descriptions of FIG. 1 and FIG. 8 will be used as aids in describing the construction shown in FIG. 14. In a liquid crystal projector such as shown in FIG. 14, in which an illumination unit 201, a liquid crystal panel unit 110, and a projection lens unit 300 are covered by a frame structure 500, the amount of heat generated by the illumination unit 280, the entrance-side polarizer, and the heat absorbing filter is large, resulting in a great rise in temperature within the liquid crystal projector surrounded by the first frame structure 500, and because of this ventilation holes 505 and fins 504 for the purpose of radiating heat are provided in the first frame structure 500 as shown in FIG. 14, as an effort to lower the temperature rise inside the liquid crystal projector.

However, because a high-intensity lamp such as a xenon lamp or halogen lamp or the like is used as the illumination source 280, the provision of heat-radiating holes 505 and 506, which is prior art, in the first frame structure 500 results in high-intensity light leaking out from holes 505 and 506, this becoming leakage light C from the liquid crystal projector, which brightly illuminates the area surrounding the liquid crystal projector.

In comparison with a CRT type display, the intensity on the screen of a magnified image from a liquid crystal projector is significantly low, making it necessary to darken room lights to obtain a dark environment for use of the liquid crystal projector.

Figure 15:
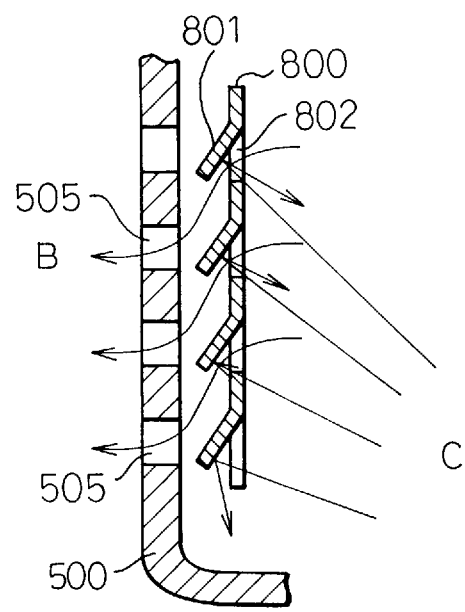
FIG. 15 is cross-sectional view A—A from FIG. 1 which shows an embodiment of the present invention.

However, light C which leaks from the liquid crystal projector itself creates the problem of illuminating the area surrounding the projection surface, thereby ruining the appearance of the display. Therefore, a third aspect of a liquid crystal projector according to the present invention provides a liquid crystal projector, for example as shown in FIG. 14, which has at least a liquid crystal panel unit 110, an illumination unit 280, and a projection lens unit 300, which are housed in the first frame structure 500, this frame structure 500 having ventilation holes 505 for the purpose of radiating heat. As shown in FIG. 15, this liquid crystal projector has a baffle 800 which has fins 801 which are adjacent the above-noted heat-radiating ventilation holes 505, and has at least the liquid crystal panel unit 110, the illumination unit 280, and the projection lens unit 300 housed in a frame structure which has heat-radiating ventilation holes 505, a baffle 800 which has fins 801 which are adjacent the above-noted heat-radiating ventilation holes 505 being provided, the above-noted fins 801 of this baffle 800 being positioned opposite the heat-radiating ventilation holes 505 of the frame structure 500.

By virtue of the construction of the third aspect of a liquid crystal projector according to the present invention, in addition to the heat, generated by the illumination unit, entrance-side polarizer, and heat absorbing filter, the chief heat-generating elements in the liquid crystal projector, being allowed to escape through ventilation holes 505, a baffle 800 is provided to prevent leakage of light.

An example of the third aspect of a liquid crystal projector according to the present invention is described below.

Specifically, as shown in FIG. 15, the illumination unit 280, the liquid crystal panel unit 110 and the projection lens unit 300 are covered by a frame structure 500 which has ventilation holes 505 that also serve as heat-radiating holes. Also, as shown in FIG. 1, inside the frame structure 500 are located such elements as a fan 400 which forcibly creates air flow within the frame structure, circuit 621 and circuit 622 which include circuits that control and drive the liquid crystal projector, and a speaker 603 which outputs sound. It is also possible to provide the fan 400 outside the frame structure 500.

Light from the illumination unit 200 or 280, after having infrared energy, the main cause of heat generation, removed from it by the heat absorbing filter 102, enters the entrance-side polarizer of the liquid crystal panel unit 110. Light which exits from the entrance-side polarizer enters the liquid crystal cell , this light becoming an image which is formed by the exit-side polarizer , this then entering the projection lens unit 300, after which is exits the projection lens unit 300 and is displayed in magnified form on a screen.

In addition to generating light, the illumination unit 280 of FIG. 1 and FIG. 14 generates heat and reaches a high temperature, with light from the illumination unit 280 having its infrared components absorbed by the heat absorbing filter 102, which thereby generates heat and reaches a high temperature. However, air is forced in from ventilation holes 501 provided in the first frame structure 500 by means of the fan, this providing air cooling of the second frame structure 100, and also providing direct air cooling of the heat absorbing filter 102, illumination lamp, and reflector from the ventilation hole in the second cover 102. The air which has picked up the heat from the second cover 102, the illumination unit 280, and the heat absorbing filter 102 passes through the holes 802 of the baffle 800 which has fins 801, with air escaping, as shown in FIG. 15, as air flow B, to the outside of the first frame structure 500 from ventilation holes 505.

While the above is an description of the case in which air is taken into the liquid crystal projector by the fan 400 via the ventilation holes 501, it is also possible to have the fan 400 exhaust air to the outside of the liquid crystal projector via ventilation holes 501.

The light, from the high-intensity xenon lamp, halogen lamp or the like, which is the lamp of the illumination unit 280, is blocked from passing through the baffle 800 and the ventilation holes 505 by the fins 801 which are provided on the baffle 800, as illustrated by the light rays C in FIG. 15. As a result, no direct light from the liquid crystal projector leaks out of the liquid crystal projector.

It is possible to use either a resin or a metallic material for the baffle 800, and it is desirable that this be black, to prevent light leakage caused by a reflection of the light.

Furthermore, in this aspect of the present invention, the angle at which the fins are provided on the baffle must be established based on the positional relationship between the heat-radiating holes on the frame structure and the illumination source, so that the light radiated from the illumination source is reflected to the inside of the frame structure by these fins.

According to the present invention as described above, in addition to causing heat radiated from the illumination unit, the entrance-side polarizer and the heat absorbing filter, which are the chief heat-generating elements in the liquid crystal projector, via ventilation holes, by providing a baffle, it is possible to not only greatly reduce the leakage of light from the liquid crystal projector itself, thereby enabling achievement of darkness in the vicinity of the projection surface and an improvement in the appearance of the projected image, but also to improve the reliability of the internal components of the liquid crystal projector.

Figure 7:
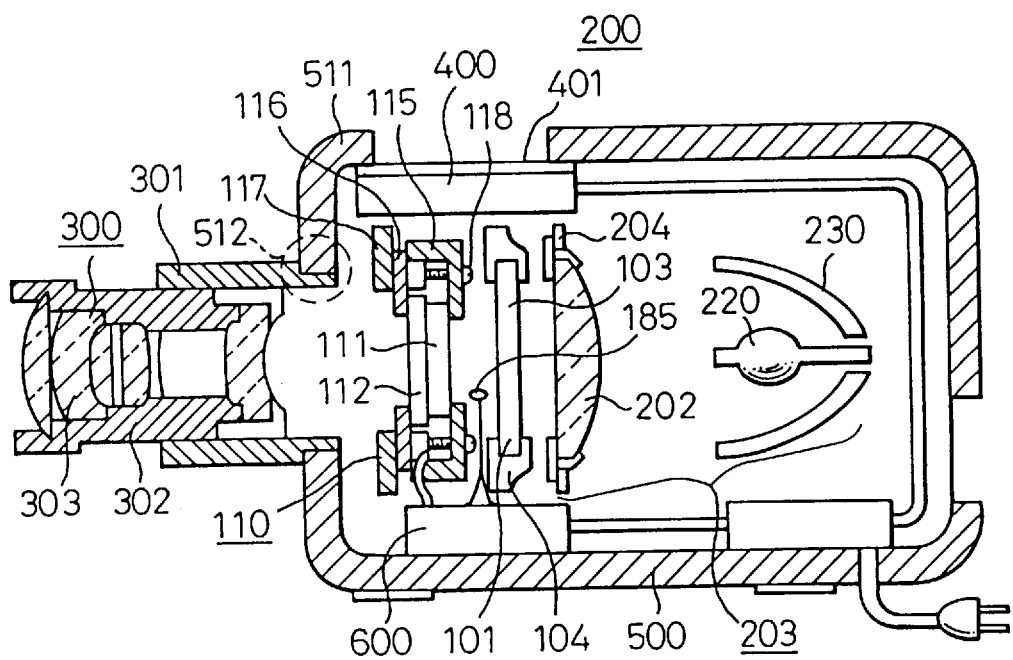
FIG. 7 is a cross-sectional view of a liquid crystal projector which shows the prior art.
Figure 16:
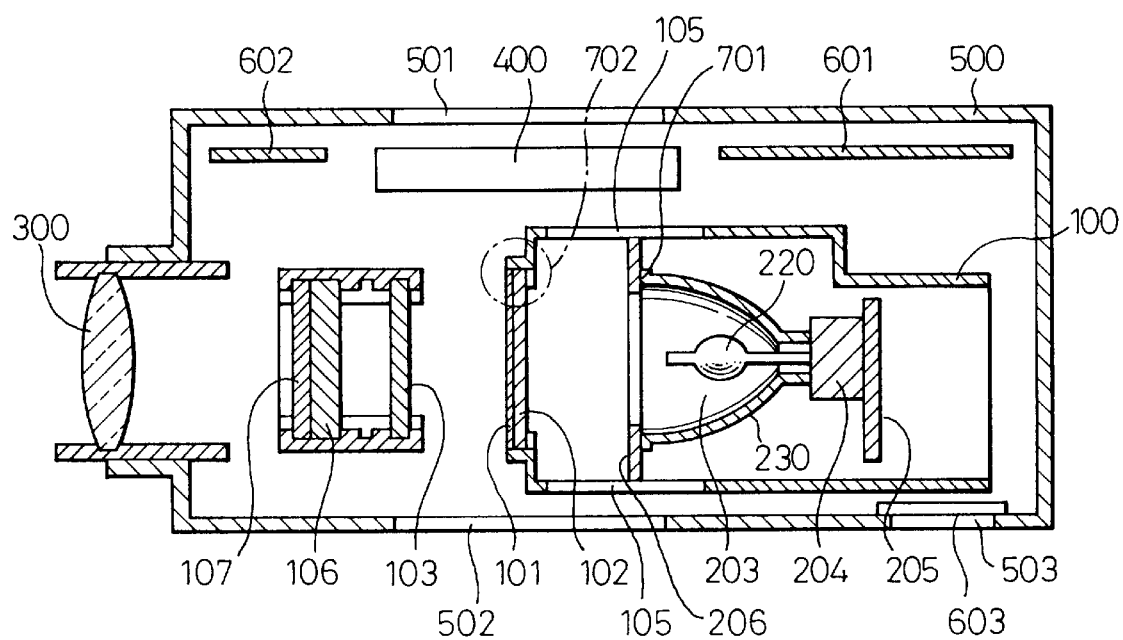
FIG. 16 is a cross-sectional view of a liquid crystal projector which shows an example of the fourth aspect of the present invention.

In the example described above, because liquid crystal projectors having the configuration shown in FIG. 1 or FIG. 7 still has the above-noted problem with regard to polarizer deterioration caused by the light source and changes in the temperature characteristics of the liquid crystal, it is necessary to solve these problems. That is, in a liquid crystal projector having the above-described construction, as shown in FIG. 16, a filter such as a heat absorbing filter could be located at the position of the condenser lens so all of the frequency components of the light of from the illumination source 201 do not strike the entrance-side polarizer 103. By providing a filter such as a heat absorbing filter, the rise in temperature of the entrance-side polarizer is reduced, although the heat radiated by the heat absorbing filter causes the problem of deterioration of the heat absorbing filter.

To solve that problem, a fourth aspect of a liquid crystal projector according to the present invention is a liquid crystal projector with the following configuration. Specifically, it is a liquid crystal projector, as shown in FIG. 16, which has a least a liquid crystal panel 106, an illumination unit 203, and a projection lens 300, these being housed within a first frame structure 500, the above-noted illumination unit 203 being formed separately from the first frame structure 500, and being provided within the second frame structure 100, which is smaller in size than the first frame structure 500, and the second frame structure 100 being housed within the first frame structure 500.

In yet another example, the liquid crystal projector has at least a liquid crystal panel 106, an illumination unit 203, and a projection lens 300, which are housed within a first frame structure 500, a filter 102 being provided between the illumination unit 203 and the liquid crystal panel 106, the illumination unit 203 and filter 102 being provided within the second frame structure 100, and the second frame structure 100 being housed within the first frame structure 500.

Yet another example of the fourth aspect of the present invention is a liquid crystal projector in which the above-noted first frame structure 500 is chiefly formed from a resin material, and in which the above-noted second frame structure 100 is formed from a metallic material having good thermal conductivity.

By virtue of the construction of the liquid crystal projector as described in the above examples, because the heat absorbing filter, at the illumination unit, entrance-side polarizer, or filter, which are the chief heat source in the liquid crystal projector, is covered by metal which has good thermal conductivity, the heat-radiating surface of the heat sources is increased, thereby having the effect of improving cooling efficiency.

In addition, because the first frame structure can be made of resin, it is possible to achieve improvement in machining and design.

What follows is a description of an example of an liquid crystal projector according to the present invention as noted above, with reference made to FIG. 16. Specifically, the illumination source 203, which is formed by the reflector 230 an the light source lamp 220, is inserted into the socket 204, this socket 204 being held by the socket support 205.

In addition, the end of the illumination source 203 that is on the opposite side from the socket 204 is in physical contact with the illumination source support 206, illumination source 203 being supported by the socket support 205 and the illumination source support 206, the end of illumination source 203 and the illumination source support 206 being in intimate physical contact, so that the heat from illumination source 203 is conducted via the contact area 701 to the illumination source support 206 and the second frame structure 100.

A heat absorbing filter 102 is provided on the opposite side of the illumination source support 206 from the illumination source 203, this heat absorbing filter 102 being supported by support 101, which is made of a transparent material. It is also possible to have the support 101 on the illumination source 203 side of the heat absorbing filter 102, and it is further possible to eliminate the support 101. The heat absorbing filter can be either an infrared cutting filter or an infrared reflecting filter.

The socket support 205, socket 204, illumination source 203, illumination source support 206, heat absorbing filter 102, and support 101 are covered by the second frame structure 100, which has ventilation holes 105.

The heat absorbing filter 102 is in physical contact with the second frame structure 100 at the contact area 702.

On the opposite side of the heat absorbing filter 102, as the illumination source 203, are provided entrance-side polarizer 103, liquid crystal cell 106, exit-side polarizer 107, and projection lens 300, these elements, as shown in FIG. 16, being covered by the first frame structure 500, which has ventilation hole 501, ventilation hole 502, and sound-output hole 503. In addition, the first frame structure 500 has within it such elements as a fan 400, which forcibly creates air flow within the frame structure, circuit 601 and circuit 602, which include circuits that control and drive the liquid crystal projector, and a speaker 603, which outputs sound.

The light from illumination unit 203, after having infrared energy, the main cause of heat generation, removed from it by the heat absorbing filter 102, enters the entrance-side polarizer 103. Light which exits from the entrance-side polarizer 103 enters the liquid crystal cell, this light becoming an image which is formed by the exit-side polarizer 107, and then enters the projection lens 300, after which is exits the projection lens 300 and is displayed in a magnified form on a screen.

In addition to generating light, illumination unit 203 generates heat and reaches a high temperature and light from the illumination unit 203 has its infrared components absorbed by the heat absorbing filter 102, which thereby generates heat and reaches a high temperature. However, air is forced in from ventilation hole 501 provided by means of the fan, this providing air cooling of the second frame structure 100, and also providing direct air cooling of the heat absorbing filter 102, and illumination source 201 from the ventilation hole 104 in the second cover 102. The air which has picked up the heat from the second frame structure 100, the illumination source 201, and the heat absorbing filter 102 passes through the ventilation hole 502. The sound-output hole 503 for a speaker, is also provided for releasing sound outside the first fame structure 500.

While this embodiment uses aluminum for the second frame structure 100 and the illumination source support 206, it is also possible to use a different metal, as long as the metal exhibits good thermal conductivity.

In this embodiment, aluminum is used for the socket support 205, thus increasing the heat-radiating surface area of the illumination source 203.

In FIG. 16, although the heat absorbing filter 102 is provided in the second frame structure 100 and the entrance-side polarizer 103 is provided outside of the second frame structure 100, it is possible to eliminate the heat absorbing filter 102 and to place the entrance-side polarizer 103 at the position of the heat absorbing filter in the second frame structure 100. It is also possible to employ a construction in which the second frame structure 100 is extended up to the entrance-side polarizer 103 and to support the entrance-side polarizer 103 in the same manner as the heat absorbing filter 102 is supported by the second frame structure 100.

According to the example of the present invention as described above, because the illumination unit, entrance-side polarizer, and heat absorbing filter, which are the chief sources of heat in the liquid crystal projector, are either directly or indirectly covered in a thermally conductive manner by a metal that has good thermal conductivity, the effect obtained is to be able to achieve a smaller liquid crystal projector, which is convenient for portable use. It is additionally possible to achieve a liquid crystal projector with improved reliability.

In addition, because the second frame structure 100 is made of metal, it is possible to make the first frame structure 500 out of resin, thereby enabling flexible design of the liquid crystal projector.

In a liquid crystal projector having the configuration as described above, as shown in FIG. 7, there is a tube support 301 mounted to the projection lens support 511, which is the projection lens end of the frame structure 500, by means of either fusion or adhesion.

Projection lens 300 is formed by a lens 303 and a lens-holding tube 302, with a helical pattern of protrusions and depressions formed in the outer surface of the lens-holding tube 302, which serves as the contact surface with respect to the tube support 301. There is a helical pattern of protrusions and depressions formed also in the contact surface between the tube support 301 and the lens-holding tube 302, forming a structure in which the helical pattern of the tube support 301 meshes with that of the lens-holding tube 302. By virtue of this mating construction, if the projection lens 300 is rotated, the projection lens 300 is extended from or retracted into the first frame structure 500, enabling adjustment of the focus of the image projected onto a screen. However, the projection lens 300 and the tube support 301 with which it meshes in helical contact are formed in the shape of cylinders, and because these have a helical pattern of depressions and protrusions on their inner surfaces, their fabrication is difficult and the cost of these components is high.

In addition the adhesion area 512 in which the tube support 301 and projection lens support 511 are adhered together must be fabricated with high precision, and problems exist related to the labor required for the adhesion operation and the time required for hardening.

In addition, to support the projection lens 300, which is part of the first frame structure 500 and which is heavy, a problem exists with the ease with which the adhesion area 512 can be broken. Therefore, a fifth aspect of a liquid crystal projector according to the present invention is a liquid crystal projector having at least liquid crystal panel formed by an entrance-side polarizer, a liquid crystal cell, and an exit-side polarizer, an illumination unit, and a projection lens which is housed in a first frame structure, having a construction such that the projection lens is held between at least two projection lens supports.

Another example is a liquid crystal projector in which at least one of the projection lens supports, which support the projection lens, is formed on, and as one with, the frame structure.

By virtue of the construction of a liquid crystal projector as described in the example given above, because the tube support 301, which is linked to projection lens 300 by means of helical threads, is divided into a number of parts, the fabrication of this tube support is simplified. Also, because one of the several parts into which the tube support is divided is formed as one with the frame structure, it is possible to hold the projection lens 300 securely. Furthermore, because the parts of the tube support other than the one part which is formed as one with the frame structure are held to the frame structure by means of a screw, it is possible to support the projection lens without the need for an adhering operation.

An example of the fifth aspect of the liquid crystal projector of the present invention will be described below, with reference made to FIG. 17 and FIG. 18.

Figure 17:
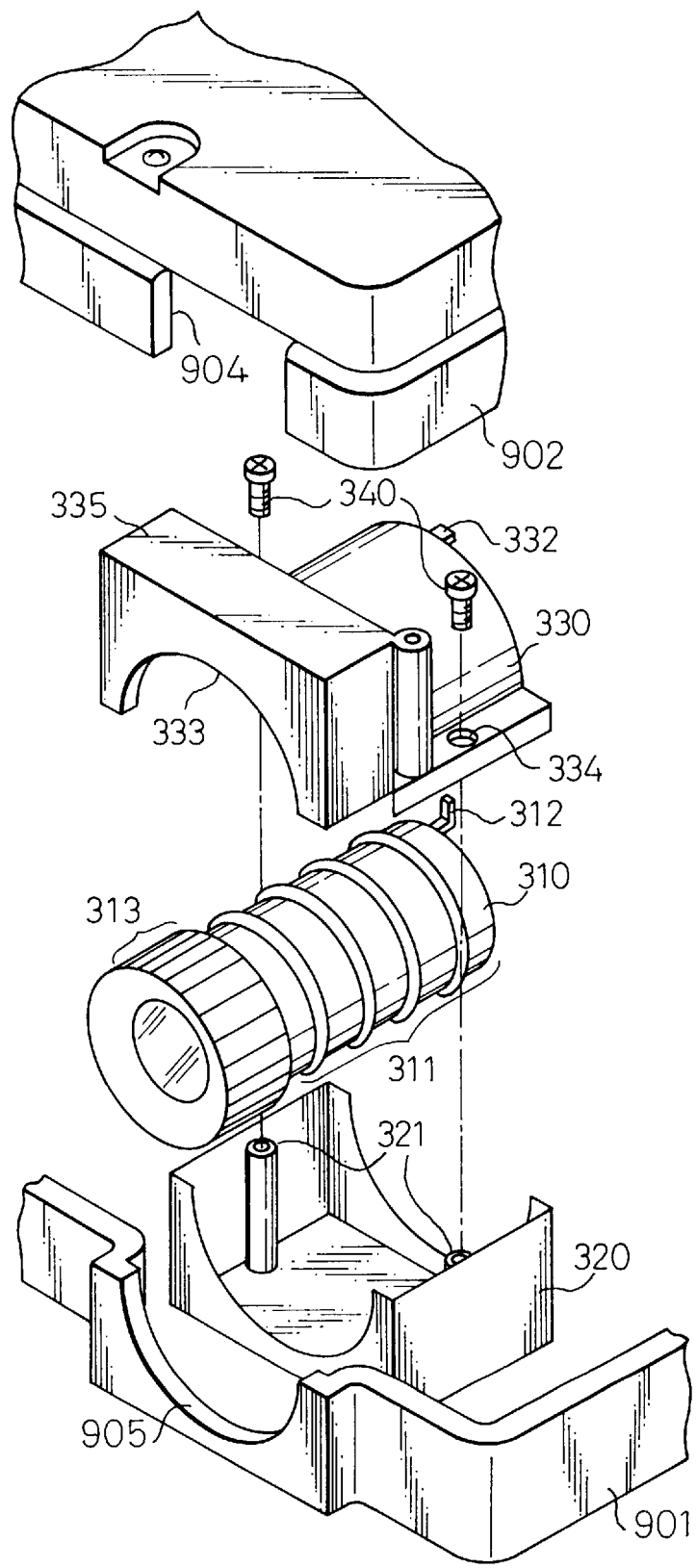
FIG. 17 is partial exploded view of a projection lens of a liquid crystal projector of an example of the fifth aspect of the present invention.
Figure 18:
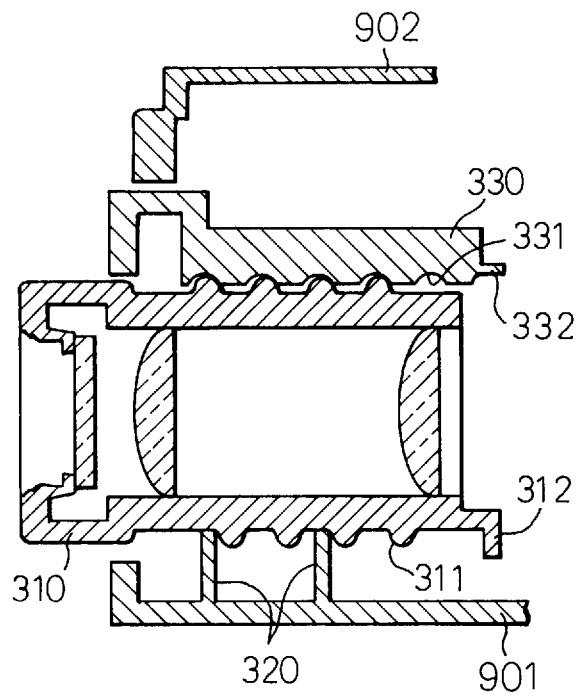
FIG. 18 is a cross-sectional view of a part of the liquid crystal projector of FIG. 1 which is an example of the fifth aspect of the present invention.

Specifically, FIG. 17 is a partial exploded view of a projection lens support of a liquid crystal projector of an example of the fifth aspect of the present invention, while FIG. 18 is a cross-sectional view of the part of the liquid crystal projector of FIG. 1 surrounding the projection lens.

In FIG. 17, a projection lens tube support 320 is provided in the bottom of a bottom frame structure 901, and an approximately circular cutout, so as to mate with the helical depressions and protrusions 311 of the projection lens support 310, is provided on at least one projection lens support. In addition, screw-receiving pins 321 for the purpose of holding together the projection lens tube support 330 and the projection lens support 320 are provided on the projection lens support 320 in neighboring locations.

On the bottom frame structure 901 toward the front of the projection lens tube support 320 is provided an approximately circular cutout 905, so as to mate with the end part 313 of projection lens support 310. The projection lens support 310 is located above the cutout 905 of the bottom frame structure 901 and the projection lens tube support 320. The projection lens support 310 has provided on it a helical configuration of depression and protrusions 311 for the purpose of converting rotational motion of the projection lens support 310 to front-to-back motion, and a stopper 312 for the purpose of limiting the front-to-back motion of the projection lens support 310.

The projection lens tube support 330 is provided at the top of the projection lens support 310, and a cutout 333 is provided in the tube support 330 so as to surround the end part 313 of the projection lens support 310.

A stopper 332 for the purpose of limiting the front-to-back movement of the projection lens support 310 and which makes contact with the stopper 312 provided on the projection lens support 310 is provided on the projection lens tube support 330, and screw receivers 334 for the purpose of holding the projection lens tube support 330 onto the top frame structure are provided in the projection lens tube support 330. As shown in FIG. 18, which is a cross-sectional view of FIG. 17, a helical pattern of protrusions and depressions 331 is provided in the approximately circular inner surface of the projection lens tube support 330.

Screws 340 are inserted from above into the screw receivers 334 of the tube support 330.

A top frame structure 902 is provided over the projection lens tube support 330 and the screws 340. A cutout 904 is provided in the top frame structure 902 so as to surround the rectangular end part 335 of the projection lens tube support 330.

The assembly procedure, making reference to FIG. 17 and FIG. 18, is as follows. The helical pattern of protrusions and depressions 331 of the projection lens support 310 is placed on top of the approximately circular cutouts of the projection lens tube support 320, which is provided on the bottom frame structure 901. The projection lens tube support 330 is placed, from above, onto the projection lens support 310 so that the screw receivers 334 of the projection lens tube support 330 are aligned with the screw-receiving pins 321 of the bottom frame structure 901. As shown in FIG. 18, the projection lens support 310 is supported by the projection lens tube support 330, and the projection lens tube support 320 has two flat receivers which have approximately circular cutouts, thereby both holding the projection lens support 310 securely and enabling it to be rotated smoothly.

There can be two or more flat receivers on the projection lens tube support 320, each having a curved cutout that is approximately circular.

While the projection lens tube support 320 is formed as one with the bottom frame structure 901, it is also possible to mount it using adhesive, screw mounting, hooks or the like, if the projection lens tube support is formed as a separate piece.

The projection lens tube support 330 is installed over the projection lens support 310 from the top such that the helical pattern of protrusions and depressions 331 of the projection lens tube support 330 mates with the helical pattern of protrusions and depressions 311 of the projection lens support 310. Screws 340 are inserted into the screw receivers 334 of the projection lens tube support 330 and screwed into the screw-receiving pins 321 of the bottom frame structure 901.

Because the projection lens support 310 is supported by means of the contour of the projection lens tube support 320, the projection lens support 310 is supported securely, and in a manner that allows smooth rotation of the projection lens support 310.

The top frame structure 902 is installed over the projection lens tube support 320 and the bottom frame structure 901 so that the rectangular end part 335 of the projection lens tube support 330 mates with the cutout 904 in the top frame structure 902, and the top frame structure 902 and bottom frame structure 901 are screwed together.

While in the above-described embodiment there are two flat receivers having approximately circular cutouts in the projection lens tube support 320, it is also possible to have, in place of the above-noted approximately circular cutouts, a construction the same as the helical pattern of protrusions and depressions 331 of the projection lens tube support 330. It is also possible to make the helical pattern of protrusions and depressions 331 of the projection lens tube support 330 have the same construction as the projection lens tube support 320.

It is possible to have divide the projection lens tube support 320 into two or more parts, and it is possible to divide the projection lens tube support 330 at a point between the rectangular end part 335 and the stopper 332.

In an example such as noted above, because the projection lens tube supports which are helically linked to the projection lens are divided, the fabrication of the tube supports is simplified. Also, because one part of the projection lens tube support is formed as one with the frame structure, secure support of the projection lens is achieved. Furthermore, by holding the divided parts of the tube support, other than the one which is formed as one with the frame structure to the frame structure, using screws, the task of performing adhesion is eliminated, thereby achieving not only a shortening of the time required for this work, but also an improvement in reliability.

In a liquid crystal projector of the example described above, is it desirable that the construction be such that it enables simple, fast replacements when parts inside the frame structure experience failures or deterioration, and to achieve this it is desirable that an opening with a cover be provided in one of the first frame structures 500. However, the joint between this opening and the cover represents not only a path for air flow, but also a location at which light leaks to the outside. If the fit between the cover and the opening is made tight, the air flow is blocked, while if the fit is made loose, the leakage of light increases. To solve this problem, the present invention provides a cover on the opening in the frame structure having a construction such that both passage of air flow and blockage of light leakage are achieved. Specifically, a sixth aspect of the present invention is a liquid crystal projector which, for example, has at least a liquid crystal panel unit 110, an illumination unit 203, and a projection lens unit 300 which are housed within a frame structure, an opening being provided in at least one of the first frame structure 500 and second frame structure 100 in which the illumination unit 203 is housed, this enabling these components to be removed and inserted, and a cover being installed onto the opening to cover the opening, the part of the cover which is joined to either the first or second frame structure or the part of either the first or second frame structure that is joined to the cover being provided with protrusions and depressions.

By virtue of the construction of the above-noted example, in addition to the high-temperature heat, generated by the illumination unit, the entrance-side polarizer, and the heat absorbing filter, which are the chief heat generation sources in the liquid crystal projector, being allowed to escape from the illumination unit replacement cover and battery replacement cover or from the frame structure which is joined to this cover, the direct light from the illumination source is prevented from escaping from inside the liquid crystal projector.

A shown in FIG. 10, which is the cross-sectional view of the basic construction of a liquid crystal projector of the above-described example, the illumination unit 200, which is formed from components which include the reflector 230 and the lamp 220, is installed inside the first frame structure 500, a heat absorbing filter 102 being provided on the light-output side of the illumination unit 200, this heat absorbing filter 102 being supported by a support that is made of a transparent material, it being possible also to eliminate this support. The heat absorbing filter can be either an infrared cutting filter or an infrared reflecting filter. The illumination unit 200 and the heat absorbing filter 102 are covered by the second frame structure 100, which has ventilation holes 105.

Figure 19:
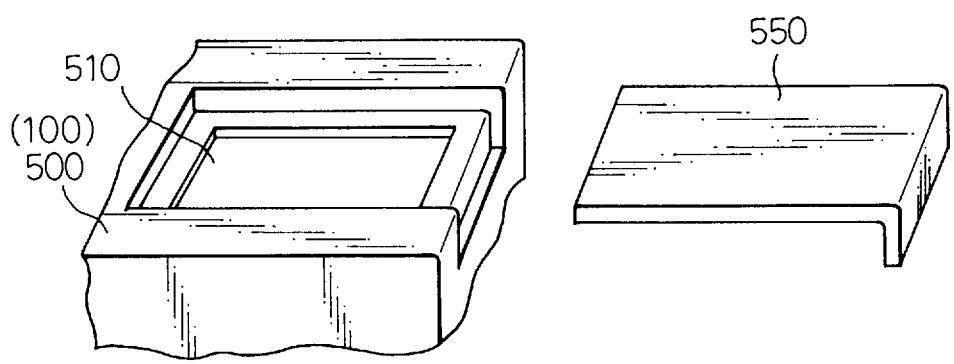
FIG. 19 is a perspective view of the aperture of an illumination unit which shows the prior art.
Figure 20:
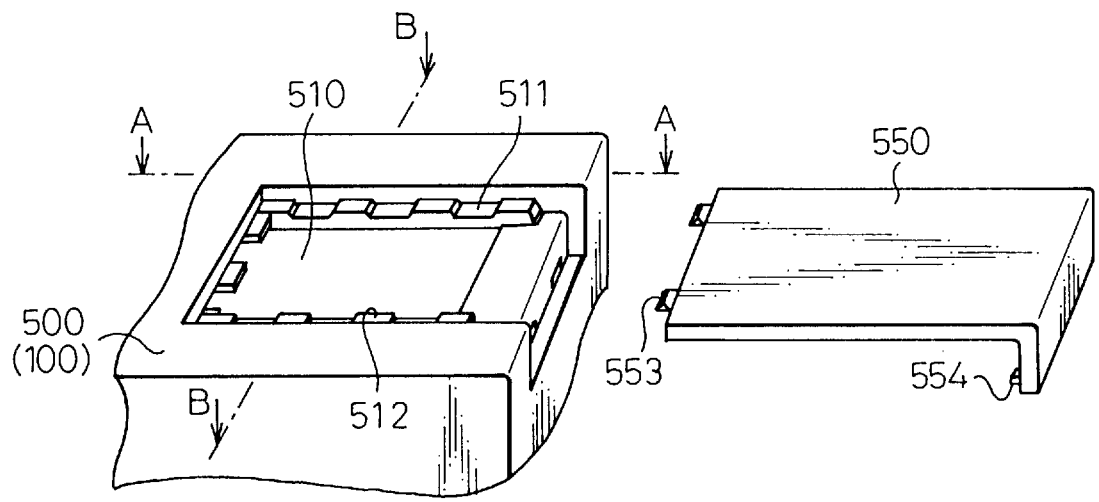
FIG. 20 is perspective view of the aperture of an illumination unit of a liquid crystal projector which shows an example of the sixth aspect of the present invention.
Figure 21:
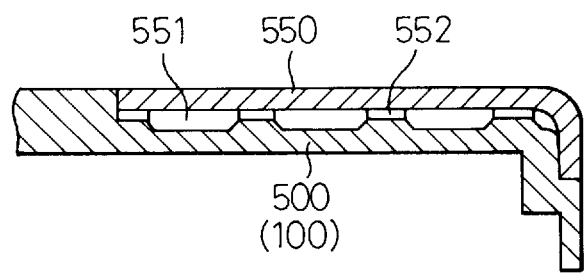
FIG. 21 is cross-sectional view A—A from FIG. 20.
Figure 22:
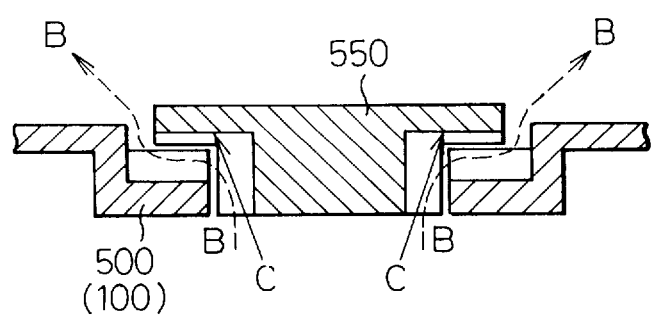
FIG. 22 is cross-sectional view B—B from FIG. 20.

In a liquid crystal projector of the above-noted configuration, in the case, for example, of the lamp 220 of the illumination unit 200 being broken due to deterioration or the like, it is possible, for example, to remove the cover 550 which usually covers the opening 510 as shown in FIG. 19, which is provided as appropriate in the second frame structure 100, and to remove the lamp 220 which is an integral part of the reflector 230, and further to remove the cover 550 of the same type of opening 510 which is provided in the first frame structure 500 to remove the lamp, and then to replace the illumination unit 200 or the lamp 220 with a new illumination unit or lamp, this being inserted into the second frame structure 200 via the above-noted opening. In the past, the mutually joined parts between the opening 510 and cover 550 which covers this opening 510 provided in the first frame structure 500 and second frame structure 100 were flat in shape, thereby preventing the flow of air, making it impossible to improve the cooling effect. To solve this problem, in the sixth aspect of the present invention, as shown in FIGS. 20 through 22, the edges of the first frame structure 500 or second frame structure 100 which is joined to the cover 550 have depressions 511 and protrusions 512. In addition, as shown in FIG. 21, which is cross-sectional view A—A from FIG. 20, there are depressions 551 and protrusions 552 provided on the cover 550 which joins with the edge of the opening of the first frame structure 500 or the second frame structure 100. Because, as shown in FIG. 21, these depressions 511 and protrusions 512 of the frame structure 500 or 100 are positioned so that depressions 511 of the frame structure are opposite depressions 551 of the cover and so that protrusions 512 of the frame structure are opposite protrusions 552 of the cover 550, the direct light C from the lamp 220 inside the liquid crystal projector does not leak out from the liquid crystal projector, as shown in FIG. 22, which is cross-sectional view B—B from FIG. 20. With regard to the air B, which is heated within the liquid crystal projector, it is released to the outside of the liquid crystal projector, as shown in FIG. 22.

Although in FIG. 22 the exhaust of hot air is shown, it is also possible to take surrounding air into the liquid crystal projector.

Hooks 553 prevents the cover 550 from falling off of the first frame structure 500 or second frame structure 100, and a guide 554 holds it onto the frame structure 500.

By virtue of the construction of a liquid crystal projector as described above, in addition to the high-temperature heat, generated by the illumination unit, the entrance-side polarizer, and the heat absorbing filter, which are the chief heat generation sources in the liquid crystal projector, being allowed to escape from the illumination unit replacement cover and also from the frame structure which is joined to the cover, because the direct light from the illumination source is not allowed to leak outside the liquid crystal projector, it is possible to achieve a darkened environment surrounding the liquid crystal projector, thereby improving the quality of the projected image, while enabling cooling within the liquid crystal projector, which achieves an improvement in the quality of the liquid crystal penel image and an improvement in the reliability of the components thereof.

In addition, although the example described above described the part that houses the illumination unit, it is possible to achieve the same effect as noted above by applying this to the part at which the cover of the battery housing part or power cord housing part is installed.

What is claimed is:

1. A liquid crystal projector comprising at least an illumination unit, a liquid crystal panel unit, a projection lens unit, and a frame structure in which said units are contained in a manner allowing free removal of each unit; said liquid crystal panel unit including a liquid crystal cell and a polarizer being supported intepratedly but separately by a liquid crystal panel unit support member in such a manner to enable their removal from said frame structure, said liquid crystal panel unit support member having a first support member and a second support member disposed oppositely to the first support member; and a plurality of hooks and catches being provided respectively on said first and second support members in an opposing relationship, and said first and second support members being removably joined together by said hooks and catches to hold the liquid crystal cell securely.

2. A liquid crystal projector comprising at least an illumination unit, a liquid crystal panel unit, a projection lens unit, and a frame structure in which said units are contained in a manner allowing free removal of each unit;

said liquid crystal panel unit including a liquid crystal cell and a polarizer being supported integratedly but separately by a liquid crystal panel unit support member in such a manner to enable their removal from said frame structure, said liquid crystal panel unit support member having a first support member and a second support member disposed oppositely to the first support member;

a plurality of hooks and catches being provided respectively on said first and second support members in an opposing relationship, and said first and second support members being removably joined together by said hooks and catches to hold the liquid crystal cell securely; and at least one additional hook being provided on said first support member to support said polarizer separate from the liquid crystal cell.

3. A liquid crystal projector comprising at least an illumination unit, a liquid crystal panel unit, a projection lens unit, and a frame structure in which said units are contained in a manner allowing free removal of each unit;

said liquid crystal panel unit including a liquid crystal cell, a first support member, and a second support member disposed oppositely to the first support member, a temperature detecting member, which detects the temperature of the liquid crystal cell, being provided in said liquid crystal panel unit; and the liquid crystal cell and temperature detecting member being supported by the first support member and the second support member.

4. A liquid crystal projector comprising at least an illumination unit, a liquid crystal panel unit, a projection lens unit, and a frame structure in which said units are contained in a manner allowing free removal;

said liquid crystal panel unit including a liquid crystal cell and a polarizer being supported integratedly but separately by a liquid crystal panel unit support member to enable their removal from the frame structure, and a temperature detecting member which detects the temperature of the liquid crystal cell;

said liquid crystal panel unit support member having a first support member and a second support member disposed oppositely to the first support member;

a plurality of hooks and catches being provided respectively on said first and second support members in an opposing relationship, and said first and second support members being removably joined together by said hooks and catches to hold the liquid crystal cell securely; and at least one additional hook being provided on said first support member to support said polarizer separate from the liquid crystal cell.

5. A liquid crystal projector comprising at least an illumination unit, a liquid crystal panel unit, a projection lens unit, and a frame structure in which said units are contained in a manner allowing free removal;

said liquid crystal panel unit including a liquid crystal cell and a polarizer being supported integratedly but separately by a liquid crystal panel unit support member to enable their removal from the frame structure, and a temperature detecting member which detects the temperature of the liquid crystal cell;

said liquid crystal panel unit support member having a first support member and a second support member disposed oppositely to the first support member;

a plurality of hooks and catches being provided respectively on said first and second support members in an opposing relationship, and said first and second support members being removably joined together by said hooks and catches to hold the liquid crystal cell securely; and at least one additional hook being provided on said second support member to support said polarizer separate from the liquid crystal cell.

6. A liquid crystal projector comprising at least an illumination unit, a liquid crystal panel unit, a projection lens unit, and a frame structure in which said units are contained in a manner allowing free removal;

said liquid crystal panel unit including a liquid crystal cell and a polarizer being supported integratedly but separately by a liquid crystal panel unit support member to enable their removal from the frame structure, and a temperature detecting member which detects the temperature of the liquid crystal cell;

said liquid crystal panel unit support member having a first support member and a second support member disposed oppositely to the first support member;

a mount for said temperature detecting member provided for the purpose of installing the temperature detecting member on the first support member, said temperature detecting member being installed closely adjacent to or in contact with said liquid crystal cell.

7. A liquid crystal projector according to claims 1 or 2, wherein said liquid crystal panel unit further comprises an exit-side polarizer, and said polarizer is an entrance-side polarizer.

8. A liquid crystal projector according to claim 3, wherein said liquid crystal panel unit further comprises an entrance-side polarizer, and an exit-side polarizer.

9. A liquid crystal projector according to claim 4, wherein said at least one additional hook includes a first additional hook and a second additional hook provided on said first support member.

10. A liquid crystal projector according to claims 8 or 9, further comprising a mount for said a temperature detecting member provided for the purpose of installing said temperature detecting member on said first support.

11. A liquid crystal projector according to claim 5, wherein said liquid crystal cell includes a glass substrate, and said temperature detecting member is mounted in contact with said glass substrate.

12. A liquid crystal projector according to claim 1, wherein said illumination unit comprises an illumination source, a reflector, a socket and a first illumination source support, said first illumination source support supporting a base of said illumination source from a first direction and said first illumination source support also supporting said reflector from a second direction opposite to the first direction.

13. A liquid crystal projector according to claim 1, wherein said illumination unit comprises an illumination source, an illumination source support, and an illumination source support spring which is connected to said second illumination source support, said illumination source comprising a lamp and a reflector, and further wherein the support force of said illumination source support spring is positioned at the approximate center axis of said lamp.

14. A liquid crystal projector according to claim 1, wherein said illumination unit comprise a lamp, a reflector, a socket, and a first lamp support, said lamp being connected to said socket, said first lamp support supporting a base of said lamp from a first direction and said first lamp support also supporting said reflector from a second direction opposite to the first direction, and comprising a lamp support spring provided on said first lamp support urging said reflector in a forward direction.

15. A liquid crystal projector according to claim 1, comprising a plurality of heat-radiation, holes provided in said frame structure, and wherein a baffle is provided within the frame structure having a plurality of fins adjacent said heat-radiation holes.

16. A liquid crystal projector according to claim 15, wherein said fins of said baffle are disposed so as to be opposite said heat-radiation holes of said frame structure.

17. A liquid crystal projector according to claims 15 or 16, wherein the inclination angle of said fins provided on said baffle is established based on the positional relationship between said heat-radiation holes on said frame structure and an illumination source in said illumination unit, in a manner such that the light radiated from said illumination source is caused to be reflected to the inside of the frame structure by said fins.

18. A liquid crystal projector according to claim 1, wherein said projection lens unit includes a projection lens and a projection lens support for holding said projection lens.

19. A liquid crystal projector according to claim 18, comprising at least two projection lens supporting members, one of which is formed on said frame structure, said projection lens support being held between said projection lens supporting members.

20. A liquid crystal projector according to claim 19, wherein said projection lens supports have a curved depression which approximates the shape of the projection lens.

21. A liquid crystal projector according to claim 20, wherein at least one of said projection lens supporting members has provided within its depression a first helical shaped section, and comprising a second helical shaped section provided on the projection lens support which mates with the first helical shaped section.

22. A liquid crystal projector according to claim 1, comprising a second frame structure, said illumination unit also housed in the second frame structure, the second frame structure being housed within said frame structure.

23. A liquid crystal projector according to claim 1, comprising a second frame structure, a filter installed in the second frame structure between said illumination unit and said liquid crystal panel, and said second frame structure being housed within said frame structure.

24. A liquid crystal projector according to claim 1, wherein said frame structure is primarily formed from a resin material, and further comprising a second frame structure formed from a metallic material having good thermal conductivity and housed within said frame structure.

25. A liquid crystal projector according to claim 22, comprising an opening provided on said frame structure, a cover to cover the opening, and a surface at the juncture between said cover and said frame structure having depressions and protrusions.

26. A liquid crystal projector according to claim 2, wherein said first support member and said second support member are held together as one by means of a holder which has spring force.

27. A liquid crystal projector as claimed in claim 6, wherein said mount includes a substrate, and said first support member has a frame-like structure that includes an opening in which the temperature detecting member is inserted, and further comprising a holder for retaining the substrate on the first support member.

28. A liquid crystal projector as claimed in claim 27, wherein said holder is formed on an elastic metal pin having a general U-shape.

29. A liquid crystal projector as claimed in claim 6, wherein said liquid crystal cell includes a glass substrate and said temperature detecting member is mounted in contact with said glass substrate.

30. A liquid crystal projector comprising at least an illumination unit, a liquid crystal panel unit, a projection lens unit, and a frame structure in which said units are contained in a manner allowing free removal of each unit;
   said illumination unit having an illumination source, a socket for supplying power to the illumination source, a first illumination source supporting member, and a contact terminal for the illumination source connected to the socket;
   a first illumination source supporting member having a first receiver supporting a base of the illumination source at one location and having a second receiver at another location opposed to the first receiver and in contact with the illumination source so that the illumination source is supported.

31. A liquid crystal projector comprising at least an illumination unit, a liquid crystal panel unit, a projection lens unit, and a frame structure in which said units are contained in a manner allowing free removal of each unit;
   said illumination unit having an illumination source, a socket for supplying power to the illumination source, and a first illumination source supporting member;
   said first illumination source supporting member having an approximate "]"-shaped part, the upper end of the "]"-shaped part forming a first receiver projecting to the inner side thereof, and a center portion of the "]"-shaped part providing a socket mount;
   a contact terminal for the illumination source connected to the socket;
   said first receiver supporting a base of the illumination source at one location, and said first illumination source supporting member having a second receiver at another location opposed to the first receiver and supporting a reflection portion of the illumination source.

32. A liquid crystal projector comprising at least an illumination unit, a liquid crystal panel unit, a projection lens unit, and a frame structure in which said units are contained in a manner allowing free removal of each unit;
   said illumination unit having an illumination source, a socket for supplying power to the illumination source in order to drive the illumination source, a first illumination source supporting member having a set of supports opposed to each other across the illumination source, a second illumination source supporting member including elastic members connected at one end and opposed to each other across the illumination source;
   a contact terminal for the illumination source connected to the socket, and the socket being supported by the first illumination source supporting member;
   the first illumination supporting member including a receiver for supporting an outer surface of the illumination source; and
   the illumination unit being held securely to the open part of the receiver by the second illumination source supporting member including the elastic members.

33. A liquid crystal projector comprising at least an illumination unit, a liquid crystal panel unit, a projection lens unit, and a frame structure in which said units are contained in a manner allowing free removal of each unit;
   a filter consisting of a thermal absorption filter or an infrared absorption filter provided between the illumination unit and the liquid crystal panel;
   a second frame structure, said illumination unit and filter being installed in said second frame structure; and
   said second frame structure being housed within the frame structure.

34. A liquid crystal projector as claimed in claim 33, wherein said frame structure is primarily formed of resin material, and second frame structure is formed of a metallic material having good thermal conductivity.

35. A liquid crystal projector comprising at least an illumination unit, a liquid crystal panel unit, a projection lens unit, and a frame structure in which said units are contained in a manner allowing free removal of each unit;
   at least one opening being provided on said frame structure in order to separately access each said unit within the frame structure for mounting or removal;
   a cover to cover the opening; and
   coupling surfaces on the cover member and the frame structure, at least one coupling surface being formed as an uneven surface.

36. A liquid crystal projector comprising at least an illumination unit, a liquid crystal panel unit, a projection lens unit, and a frame structure in which said units are contained in a manner allowing free removal of each unit;

said liquid crystal panel unit including a liquid crystal cell, and entrance-side polarizer, and an exit-side polarizer;

said liquid crystal cell and at least one of said polarizers being supported integratedly but separately by a liquid crystal panel unit support member in such a manner to enable their removal from the frame structure;

said liquid crystal panel unit support member including a first support member and a second support member disposed opposite to the first support member, said members being primary structural members of said liquid crystal panel unit support member;

a plurality of hooks and catches being provided respectively on said first and second support members in an opposing relationship, and said first and second support members being removably joined together by said hooks and catches; and an additional coupling member having an elastic force for joining together said first and second support members.

* * * * *

UNITED STATES PATENT AND TRADEMARK OFFICE
CERTIFICATE OF CORRECTION

PATENT NO.   :   5,842,761
DATED        :   December 1, 1998
INVENTOR(S)  :   Shigeru FUTAKAMI et al.

It is certified that error appears in the above-indentified patent and that said Letters Patent is hereby corrected as shown below:

In the claims:

Claim 1, Col. 20, line 31, "intepratedly" should read --integratedly--.

Claim 20, Col. 23, line 7, change "supports" to --supporting members--.

Claim 20, Col. 23, line 8, after "lens", insert --support--.

Claim 34, Col. 24, line 53, before "second", insert --said--.

Signed and Sealed this

Seventeenth Day of August, 1999

Attest:

Q. TODD DICKINSON

Attesting Officer

Acting Commissioner of Patents and Trademarks